US009264637B2

(12) United States Patent
Sugawa et al.

(10) Patent No.: US 9,264,637 B2
(45) Date of Patent: Feb. 16, 2016

(54) SOLID-STATE IMAGE PICKUP APPARATUS
(71) Applicant: OLYMPUS CORPORATION, Tokyo (JP)
(72) Inventors: Shigetoshi Sugawa, Miyagi (JP); Nana Akahane, Tokyo (JP); Satoru Adachi, Ibaraki (JP)
(73) Assignees: Tohoku University, Miyagi (JP); OLYMPUS CORPORATION, Tokyo (JP)
(*) Notice: Subject to any disclaimer, the term of this patent is extended or adjusted under 35 U.S.C. 154(b) by 0 days.
(21) Appl. No.: 14/513,365
(22) Filed: Oct. 14, 2014
(65) Prior Publication Data
US 2015/0029375 A1 Jan. 29, 2015

Related U.S. Application Data
(63) Continuation of application No. PCT/JP2013/060383, filed on Apr. 4, 2013.

(30) Foreign Application Priority Data

Apr. 19, 2012 (JP) ................................. 2012-095784

(51) Int. Cl.
H04N 5/217 (2011.01)
H04N 3/14 (2006.01)
(Continued)
(52) U.S. Cl.
CPC ............. *H04N 5/363* (2013.01); *H04N 5/3575* (2013.01); *H04N 5/378* (2013.01); *H04N 5/3742* (2013.01); *H04N 5/3745* (2013.01)
(58) Field of Classification Search
CPC ... H04N 5/378; H04N 5/374; H04N 5/37457; H04N 5/365; H04N 5/3742; H04N 5/347; H04N 5/357; H04N 5/361; H04N 5/37455; H04N 5/37452; H04N 5/3575; H04N 5/3577; H04N 5/363; G06T 5/002

USPC .................................. 348/241–251, 294–326
See application file for complete search history.

(56) References Cited

U.S. PATENT DOCUMENTS 8,421,892 B2 * 4/2013 Endo et al. ..................... 348/308
8,759,740 B2 * 6/2014 Akahane ..................... 250/208.1
(Continued)

FOREIGN PATENT DOCUMENTS

EP 1 014 683 A2 6/2000
EP 1 207 686 A1 5/2002
(Continued)

OTHER PUBLICATIONS

International Search Report dated Jun. 4, 2013 issued in PCT/JP2013/060383.
(Continued)

Primary Examiner — Chia-Wei A Chen
(74) Attorney, Agent, or Firm — Scully, Scott, Murphy & Presser, P.C.

(57) ABSTRACT

A solid-state image pickup apparatus including: two-dimensionally arrayed unit pixels, each including a PD performing optical-electrical conversion of an incident light; an FD and two output terminals provided for each of pixel groups, each including one or more unit pixels, the two output terminals being capable of outputting a noise signal and a signal-noise sum signal separately; first and second transfer lines to which the output terminals are connected in common and which are capable of holding noise signal voltage and signal-noise sum signal voltage, respectively; first switches arranged between the output terminals and the first transfer lines; second switches arranged between the output terminals and the second transfer lines; third and fourth switches provided for the transfer lines, respectively; and third and fourth transfer lines to which the transfer lines are connected in parallel via third and fourth switches, respectively.

5 Claims, 12 Drawing Sheets

(51) Int. Cl.
*H04N 5/335* (2011.01)
*H04N 5/363* (2011.01)
*H04N 5/357* (2011.01)
*H04N 5/3745* (2011.01)
*H04N 5/378* (2011.01)
*H04N 5/374* (2011.01)

(56) References Cited

U.S. PATENT DOCUMENTS

| | | | |
|---|---|---|---|
| 8,854,507 B2* | 10/2014 | Joboji et al. | 348/243 |
| 2002/0190215 A1 | 12/2002 | Tashiro et al. | |
| 2003/0193585 A1 | 10/2003 | Ogura et al. | |
| 2005/0018065 A1 | 1/2005 | Tashiro et al. | |
| 2006/0181628 A1* | 8/2006 | Kishi | 348/308 |
| 2007/0052831 A1 | 3/2007 | Ogura et al. | |
| 2012/0050594 A1 | 3/2012 | Okita | |
| 2012/0162484 A1* | 6/2012 | Mo et al. | 348/241 |
| 2012/0268727 A1* | 10/2012 | Schrey et al. | 356/5.01 |
| 2014/0077057 A1* | 3/2014 | Chao et al. | 250/208.1 |

FOREIGN PATENT DOCUMENTS

| | | |
|---|---|---|
| JP | 06-339085 A | 12/1994 |
| JP | 10-304238 A | 11/1998 |
| JP | 2000-004399 A | 1/2000 |
| JP | 2000-059691 A | 2/2000 |
| JP | 2000-295534 A | 10/2000 |
| JP | 2002-344809 A | 11/2002 |
| JP | 2003-259227 A | 9/2003 |
| JP | 2004-294420 A | 10/2004 |

OTHER PUBLICATIONS

Extended Supplementary European Search Report dated Jul. 7, 2015 from related European Application No. 13 77 8037.5.

* cited by examiner

SOLID-STATE IMAGE PICKUP APPARATUS

CROSS-REFERENCE TO RELATED APPLICATIONS

This is a continuation of International Application PCT/JP2013/060383, with an international filing date of Apr. 4, 2013, which is hereby incorporated by reference herein in its entirety.
This application is based on Japanese Patent Application No. 2012-095784, filed on Apr. 19, 2012, the contents of which are incorporated herein by reference.

TECHNICAL FIELD

The present invention relates to a solid-state image pickup apparatus.

BACKGROUND ART

Conventionally, there has been known an amplification-type solid-state image pickup apparatus which converts signal charges accumulated by an optical-electrical conversion element to signal voltage in pixels and then outputs the signal voltage to a signal line, as represented by a CMOS (complementary metal-oxide semiconductor) image sensor (see, for example, PTL 1). In this solid-state image pickup apparatus, all vertical signal lines are provided with two capacitive elements which cause voltage which occurs at the time of resetting a charge-voltage conversion element in a pixel (hereinafter referred to as noise voltage) and voltage obtained by adding a signal charge generated by optical-electrical conversion to the noise voltage (hereinafter referred to as signal-noise sum voltage) to be outputted from the charge-voltage conversion element in the pixel and held separately.

This solid-state image pickup apparatus is configured so as to perform noise removal by, after holding noise voltages from all pixels of a line selected by a vertical shift register and signal-noise sum voltages into the capacitive elements, outputting the noise voltages and the signal-noise sum voltages from the two capacitive elements provided for a column selected by a horizontal shift register and calculating difference between these voltages by a CDS circuit.

CITATION LIST

Patent Literature

{PTL 1}
Japanese Unexamined Patent Application, Publication No. 2000-4399

SUMMARY OF INVENTION

The present invention provides the following solutions.
An aspect of the present invention is a solid-state image pickup apparatus provided with: a plurality of two-dimensionally arrayed unit pixels, each of the unit pixels including an optical-electrical conversion element performing optical-electrical conversion of an incident light; a charge conversion element and two output terminals provided for each of a plurality of pixel groups, each pixel group including one or more of the unit pixels, the charge conversion element converting a signal charge optical-electrical converted by the optical-electrical conversion element of each of the unit pixels in the pixel group into a voltage or current, and the two output terminals being capable of outputting a noise signal that occurs at the time of resetting the charge conversion element and a signal-noise sum signal obtained by adding a signal that has occurred by optical-electrical conversion to the noise signal separately; a plurality of first transfer lines to which ones of the output terminal pairs of a plurality of the pixel groups are connected in common, the plurality of first transfer lines being capable of holding voltages based on the noise signals outputted from the output terminals; a plurality of second transfer lines to which the others of the output terminal pairs of the plurality of the pixel groups are connected in common, the plurality of second transfer lines being capable of holding voltages based on the signal-noise sum signals outputted from the output terminals; first switches arranged between the ones of the output terminal pairs and the first transfer lines; second switches arranged between the others of the output terminal pairs and the second transfer lines; a third switch provided for each of the first transfer lines; a fourth switch provided for each of the second transfer lines; a third transfer line to which the plurality of first transfer lines are connected in parallel via the third switches, respectively; and a fourth transfer line to which the plurality of second transfer lines are connected in parallel via the fourth switches, respectively.

DESCRIPTION OF EMBODIMENTS

First Embodiment

A solid-state image pickup apparatus 1 according to a first embodiment of the present invention will be described below with reference to drawings.

Figure 1:
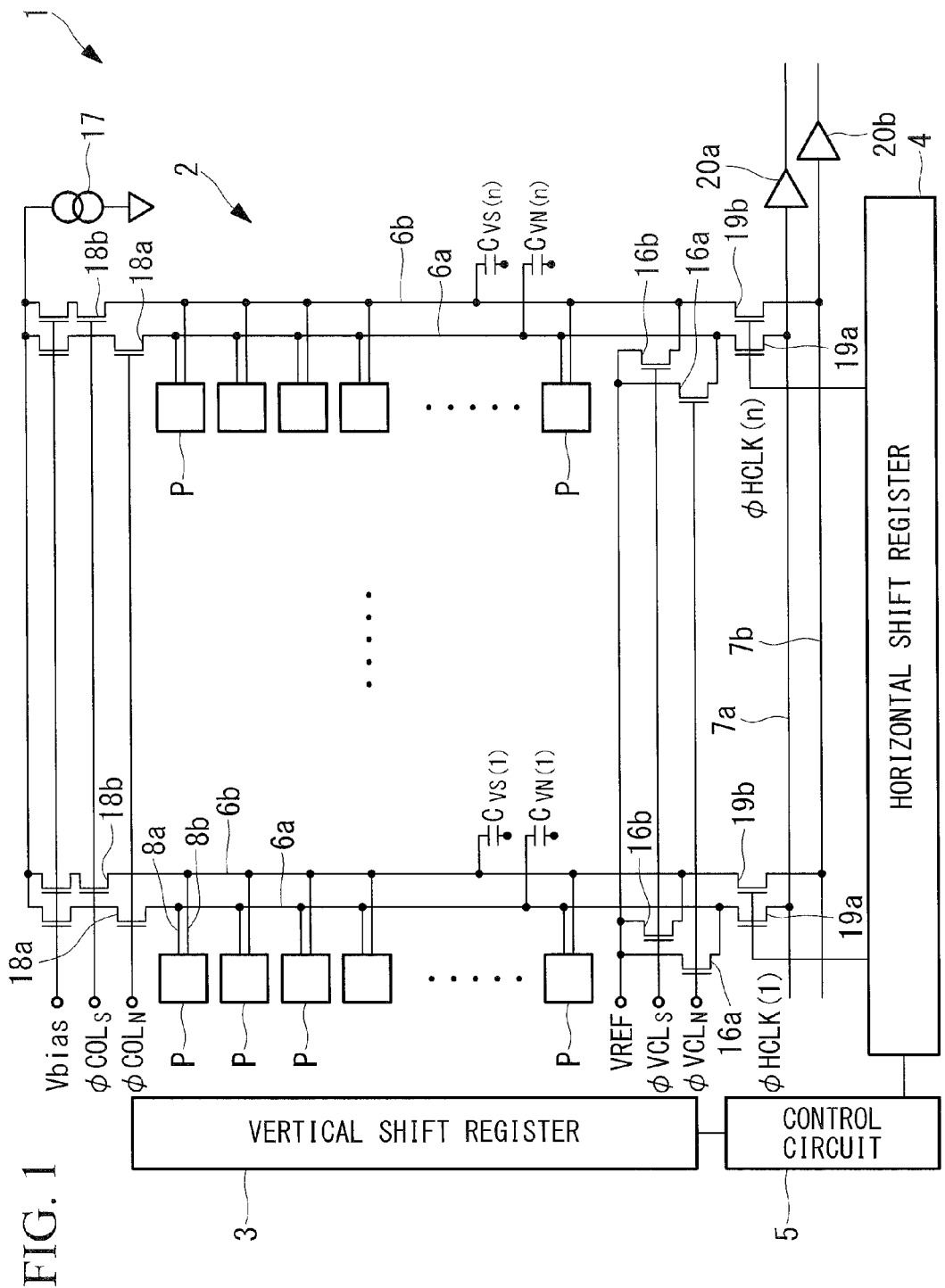
FIG. 1 is a circuit diagram showing a configuration of a solid-state image pickup apparatus according to a first embodiment of the present invention.

As shown in FIG. 1, the solid-state image pickup apparatus 1 according to the present embodiment is provided with: a pixel array 2 provided with a plurality of pixels P, a vertical shift register 3, a horizontal shift register 4 and a control circuit 5 which controls these shift registers 3 and 4.

The pixel array 2 is provided with: the plurality of pixels P arrayed in a matrix shape, that is, in a state in which a predetermined number of pixels are arrayed in line and column directions; a plurality of pairs of vertical signal lines (first and second transfer lines) 6a and 6b to which a plurality of pixels P belonging to the same column are connected in common; and a pair of horizontal signal lines (third and fourth transfer lines) 7a and 7b to which the plurality of pairs of vertical signal lines 6a and 6b are connected in common. In the present embodiment, one pixel P constitutes one pixel group.

Figure 2:
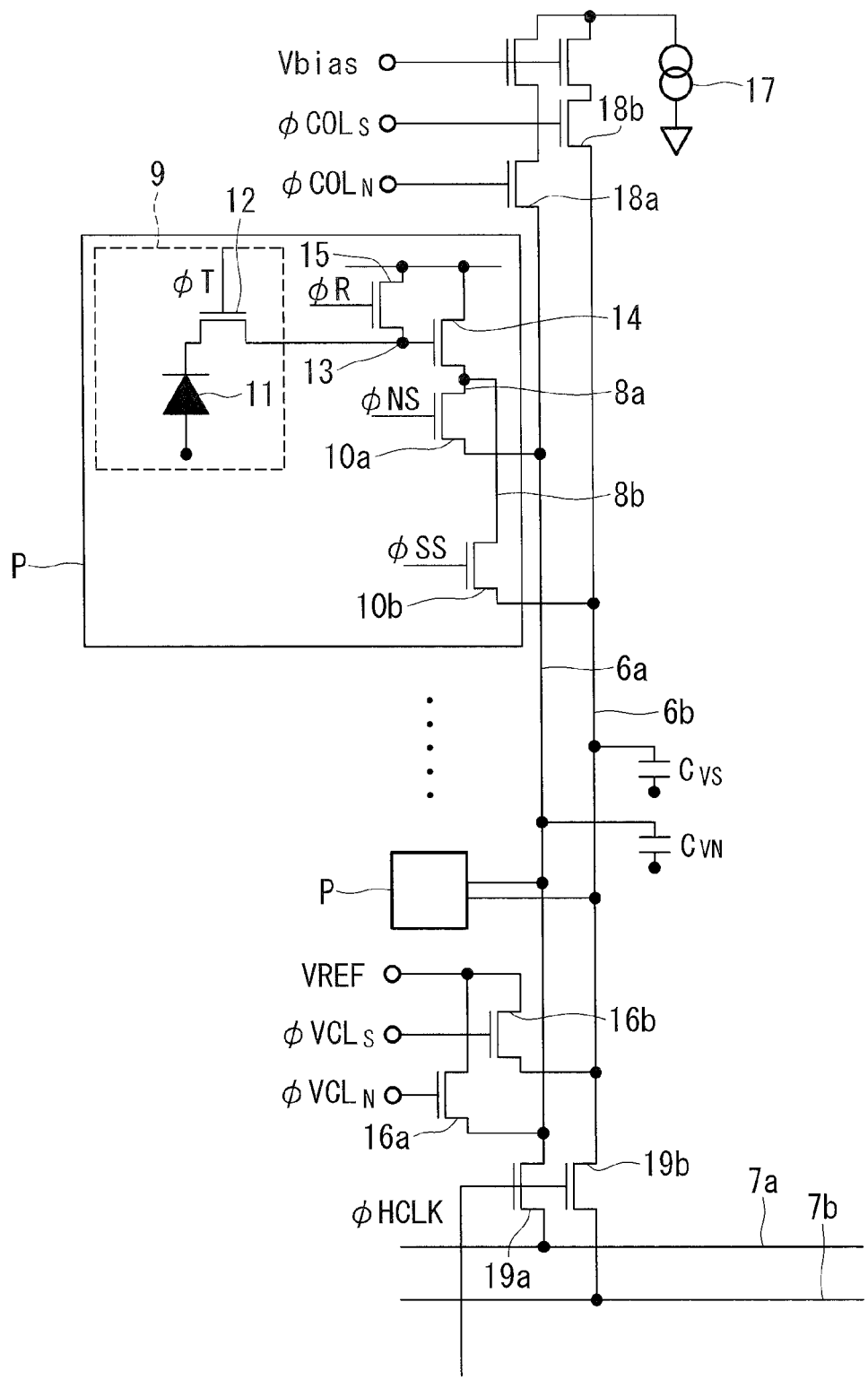
FIG. 2 is a circuit diagram showing a configuration of a column circuit including pixels which is provided for the solid-state image pickup apparatus of FIG. 1.

As shown in FIG. 2, each pixel P is provided with: a unit pixel 9; a floating diffusion (FD; charge conversion element) 13 which converts a signal charge outputted from the unit pixel 9 to voltage; an amplifier transistor 14 which reads out signal charges accumulated in the FD 13 as voltage; an FD reset transistor 15 which is connected between the amplifier transistor 14 and a transfer transistor 12 and which resets voltage of the FD 13; and two selection transistors (first and second switches) 10a and 10b arranged between two output lines (output terminals) 8a and 8b of the amplifier transistor 14 and a pair of vertical signal lines 6a and 6b, respectively.

Each unit pixel 9 is provided with a photo diode (PD, optical-electrical conversion element) 11 which performs optical-electrical conversion of a received optical signal and accumulates signal charges, and the transfer transistor 12 which transfers the signal charges accumulated in the PD 11.

The source of the amplifier transistor 14 is branched into the two output lines 8a and 8b. The amplifier transistor 14 is adapted to amplify signal voltage of the FD 13 connected to its gate and outputs the signal to the output lines. Specifically, by an FD reset pulse φR being inputted to the gate of the FD reset transistor 15 from the vertical shift register 3, the gate of the amplifier transistor 14 enters an active state and enters a readout enabled state. At the same time, a signal charge transferred to the FD 13 is discharged to the drain side of the FD reset transistor 15. Thereby, the voltage of the FD 13 is reset.

The transfer transistor 12 is adapted to, by a transfer pulse φT being inputted to its gate, transfer signal charges accumulated by the PD 11 from the PD 11 on the source side to the FD 13 on the drain side. The φT signal to the transfer transistor 12 is inputted for each column. The amount of signal charge accumulated by the PD 11 is reset to zero by this transfer operation. The FD 13 is adapted to generate signal voltages corresponding to the signal charges transferred from the PD 11 via the transfer transistor 12.

One selection transistor 10a is adapted to, by a noise readout pulse φNS being inputted to its gate, output the signal voltage generated in the FD 13 from the amplifier transistor 14 on the source side to one vertical signal line 6a on the drain side. The other selection transistor 10b is adapted to, by a signal readout pulse φSS being inputted to its gate, output the signal voltage generated in the FD 13 from the amplifier transistor 14 on the drain side to the other vertical signal line 6b on the source side.

Each of the vertical signal lines 6a and 6b is provided with a reset part which resets its electric potential. The reset parts are configured with signal line reset transistors 16a and 16b which, by reset pulses φVCL$_S$ and φVCL$_N$ being inputted to their gates, reset the vertical signal lines 6a and 6b to VREF, respectively.

The vertical signal lines 6a and 6b are provided with the constant current source connection switches 18a and 18b which are arranged between the vertical signal lines 6a and 6b and a constant current source 17 and which switch between electrical connection and disconnection between the vertical signal lines 6a and 6b and the constant current source 17; and vertical signal line selection switches (third and fourth switches) 19a and 19b which switch between electrical connection and disconnection between the vertical signal lines 6a and 6b and the horizontal signal lines 7a and 7b, respectively.

The vertical shift register 3 is adapted to, by selecting one line from the pixel array 2 and inputting the pulses φR, φT, φNS and φSS to pixels P belonging to the selected line, cause a signal to be outputted from each pixel P to the vertical signal lines 6a and 6b.

The horizontal shift register 4 is adapted to, by inputting a vertical signal line selection pulse φHCLK to the vertical signal line selection switches 19a and 19b, cause a signal to be outputted to the horizontal signal lines 7a and 7b from the vertical signal lines 6a and 6b to which the vertical signal line selection pulse φHCLK has been inputted.

The control circuit 5 is adapted to, by outputting a control signal for causing each pulse described above to be outputted to the vertical shift register 3 and the horizontal shift register 4 in accordance with a pulse sequence set in advance, control an operation of reading out a signal from the pixel array 2.

In FIGS. 1 and 2, signs $C_{VS}$ and $C_{VN}$ denote parasitic capacitances of the vertical signal lines 6a and 6b, respectively.

Figure 3:
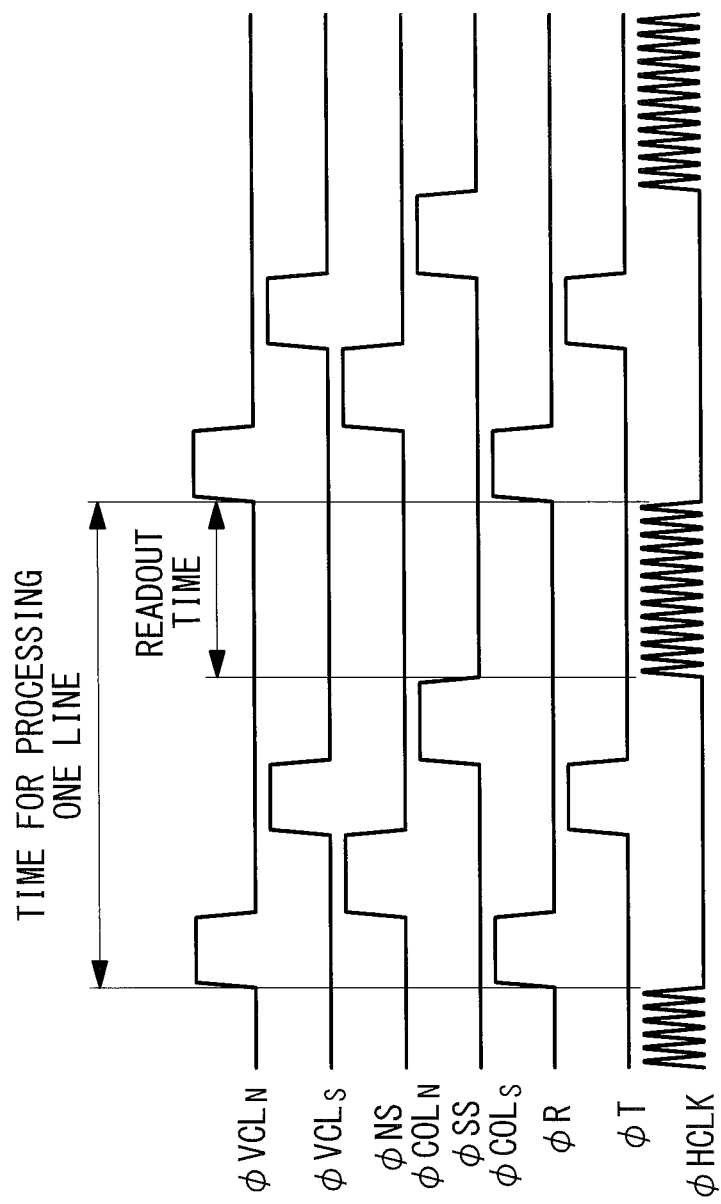
FIG. 3 is a timing chart showing an operation of the solid-state image pickup apparatus of FIG. 1.

Next, a method for driving the solid-state image pickup apparatus 1 configured as above will be described with reference to a timing chart in FIG. 3.

The solid-state image pickup apparatus 1 according to the present embodiment reads out voltage related to an optical signal received by a pixel P and voltage related to noise which occurs at the time of resetting the FD 13 (hereinafter referred to as "noise voltage (a noise signal)"). Here, the voltage related to an optical signal received by the pixel P includes the above-described noise voltage which occurs at the time of resetting the FD 13. That is, in the solid-state image pickup apparatus 1 according to the present embodiment, the noise voltage and voltage obtained by adding the voltage related to an optical signal received by the pixel P to the noise voltage (hereinafter referred to as "signal-noise sum voltage (signal-noise sum signal)") are separately read out.

An operation of reading out the noise voltage and the signal-noise sum voltage can be roughly divided into three operations: an operation of outputting the noise voltage to one vertical signal line 6a and causing the noise voltage to be held in the parasitic capacitance of the vertical signal line 6a temporarily; an operation of outputting the signal-noise sum voltage to the other vertical signal line 6b and causing the signal-noise sum voltage to be held in the parasitic capacitance of the vertical signal line 6b temporarily; and an operation of reading out the noise voltage and the signal-noise sum voltage held in the pair of vertical signal lines 6a and 6b, respectively, to the pair of the horizontal signal lines 7a and 7b.

First, the operation of outputting the noise voltage to one vertical signal line 6a and causing the noise voltage to be held temporarily is performed as shown below.

First, in a state in which the constant current source connection switches 18a of all the vertical signal lines 6a are disconnected, the reset pulse φVCL$_N$ is applied to the signal line reset transistor 16a, which constitutes the reset part of each of the vertical signal lines 6a, and the vertical signal lines 6a are reset to the electric potential VREF. At the same time, by the FD reset pulse φR being applied to each of pixels P belonging to a line to be an output target, from the vertical shift register 3, the electric potential of the FD 13 is reset, and the amplifier transistors 14 of the selected pixels P enter an active state.

By inputting a pulse φCOL$_N$ to the gates of the constant current source connection switches 18a provided for the vertical signal lines 6a in this state, the constant current source connection switches 18a enter an ON state, and a constant current flows through the vertical signal lines 6a. At the same time, by the noise readout pulse φNS being inputted to the gates of the selection transistors 10a of the output lines 8a connected to the vertical signal lines 6a, the selection transistors 10a electrically connect, and the noise voltage of the FD 13 which has been reset is outputted to the vertical signal lines 6a. Then, by stopping input of the pulse φCOL$_N$ after holding the input for a predetermined time, and switching the constant current source connection switches 18a to an OFF state, the vertical signal lines 6a enter a floating potential state, and the noise voltage is held temporarily in the parasitic capacitances of the vertical signal lines 6a.

Next, the reset pulses φVCL$_S$ is applied to the signal line reset transistor 16b, which constitutes the reset part of each of all the vertical signal lines 6b, and the vertical signal lines 6b are reset to the electric potential VREF. At the same time, by the transfer pulse φT being applied to the gate of the transfer transistor 12 of each pixel P belonging to a line to be an output target, from the vertical shift register 3, signal charges accumulated by the PD 11 are transferred from the PD 11 to the FD 13, and the electric potential of the FD 13 is set to the signal-noise sum voltage.

In this state, the amplifier transistor 14 is in an electrical connection state. Therefore, by inputting a pulse φCOL$_S$ to the gates of the constant current source connection switches 18b provided for the other vertical signal lines 6b, the constant current source connection switches 18b enter an ON state, and a constant current flows through the vertical signal lines 6b. At the same time, by the noise readout pulse φSS being inputted to the gates of the selection transistors 10b of the output lines 8b connected to the vertical signal lines 6b, the selection transistors 10b electrically connect, and the signal-noise sum voltage set for the FD 13 is outputted to the vertical signal lines 6b. Then, by stopping input of the pulse φCOL$_S$ after holding the input for a predetermined time, and switching the constant current source connection switches 18b to an OFF state, the vertical signal lines 6b enter a floating potential state, and the outputted signal-noise sum voltage is held temporarily in the parasitic capacitances of the vertical signal lines 6b.

The operation of reading out the noise voltage and the signal-noise sum voltage from the vertical signal lines 6a holding the noise voltage and the vertical signal lines 6b holding the signal-noise sum voltage is performed as shown below.

That is, in a state in which noise voltages and signal-noise sum voltages from all the pixels P within the same line are held in the plurality of pairs of vertical signal lines 6a and 6b, the vertical signal line selection pulse φHCLK is applied to the vertical signal line selection switches 19a from the horizontal shift register 4.

Thereby, the noise voltages held in the vertical signal lines 6a are read out to the horizontal signal lines 7a, and the signal-noise sum voltages held in the vertical signal lines 6b are read out to the horizontal signal lines 7b. Signal amplifiers 20a and 20b are provided for the horizontal signal lines 7a and 7b, respectively. The read-out noise voltage and signal-noise sum voltage are inputted to a differential amplifier not shown, which is arranged at a subsequent stage, after being amplified by the signal amplifiers 20a and 20b, and signal voltage is calculated by difference calculation being performed at the differential amplifier.

That is, by sequentially reading out the noise voltage and the signal-noise sum voltage to the horizontal signal lines 7a and 7b, for all the plurality of pairs of vertical signal lines 6a and 6b, pixel signals corresponding to one line can be obtained. Therefore, by sequentially changing the line to be selected, by the vertical shift register 3, and performing the same process, pixel signals of all the pixels P can be outputted to acquire one image.

In this case, according to the solid-state image pickup apparatus 1 according to the present embodiment, since the noise voltage and the signal-noise sum voltage which have been separately outputted from the same pixel P are separately held in a pair of vertical signal lines 6a and 6b, it is possible to hold the signal-noise sum voltage within a short time immediately after holding the noise voltage. As a result, there is an advantage that it is possible to output a signal with a high noise immunity even if output of the pixels P fluctuates during a readout period.

Second Embodiment

Next, a solid-state image pickup apparatus 30 according to a second embodiment of the present invention will be described with reference to drawings. In description of the present embodiment, parts common to components of the solid-state image pickup apparatus 1 according to the first embodiment stated above are given the same signs, and description thereof will be omitted.

Figure 4:
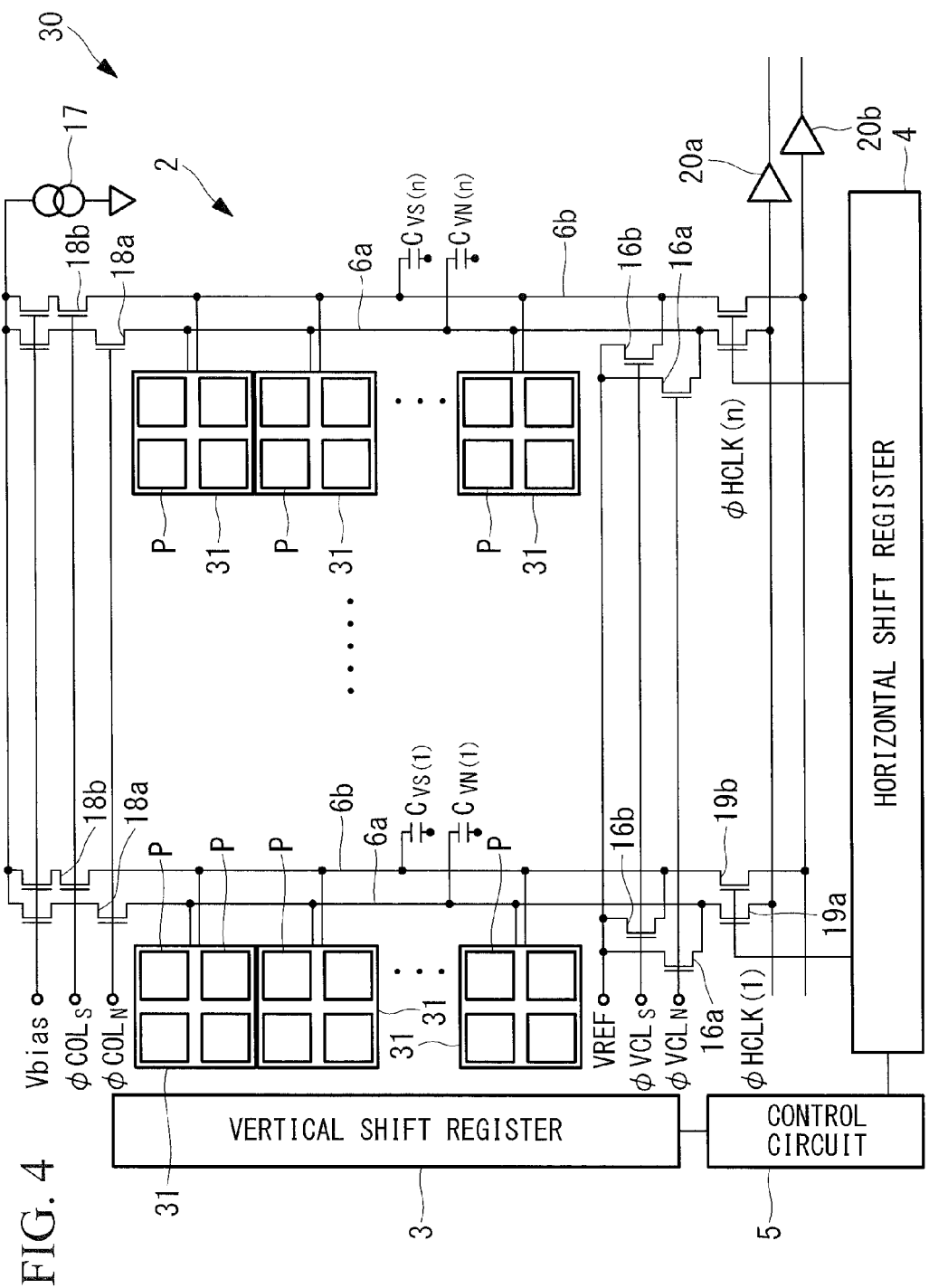
FIG. 4 is a circuit diagram showing a configuration of a solid-state image pickup apparatus according to a second embodiment of the present invention.

The solid-state image pickup apparatus 30 according to the present embodiment is different from the solid-state image pickup apparatus 1 according to the first embodiment in that, though the solid-state image pickup apparatus 1 is provided with the amplifier transistor 14, the FD reset transistor 15 and the two selection transistors 10a and 10b in each of all the pixels P, 2×2=4 pixels P share the amplifier transistor 14, the FD reset transistor 15 and the two selection transistors 10a and 10b as shown in FIG. 4.

Figure 5:
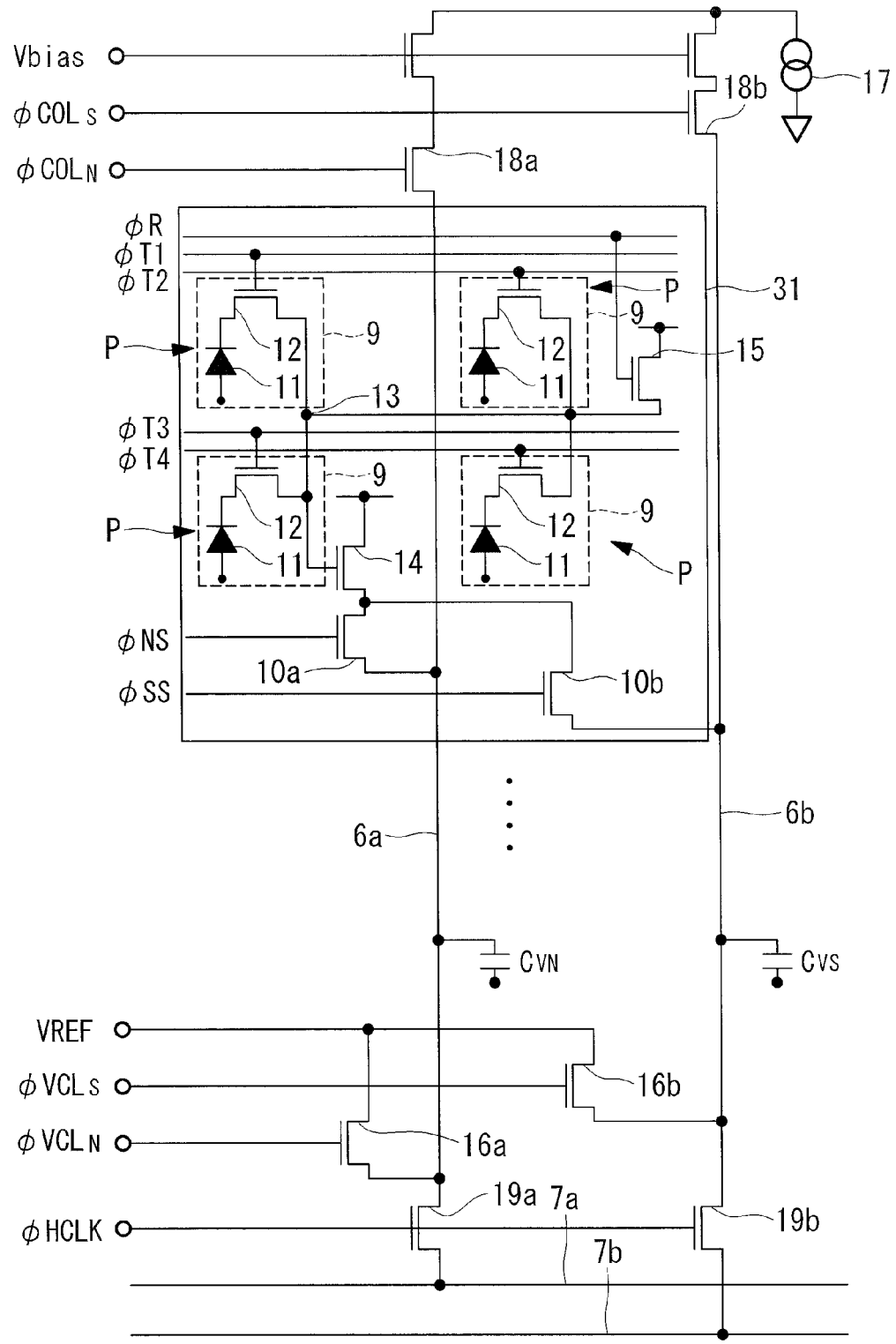
FIG. 5 is a circuit diagram showing a configuration of a column circuit including pixels which is provided for the solid-state image pickup apparatus of FIG. 4.

That is, in a pixel group 31 including four unit pixels 9 arrayed in a square array of 2×2 in the solid-state image pickup apparatus 30 according to the present embodiment, each unit pixel 9 is provided with the PD 11 and the transfer transistor 12; the drain sides of all the transfer transistors 12 are connected to the common FD 13; and the single FD reset transistor 15 which resets the FD 13, the amplifier transistor 14 which reads out signal charges accumulated in the FD 13 as voltage, and the two selection transistors 10a and 10b provided for two output lines 8a and 8b branched on the source side of the amplifier transistor 14, respectively, are shared by each pixel group 31, as shown in FIG. 5.

Figure 6:
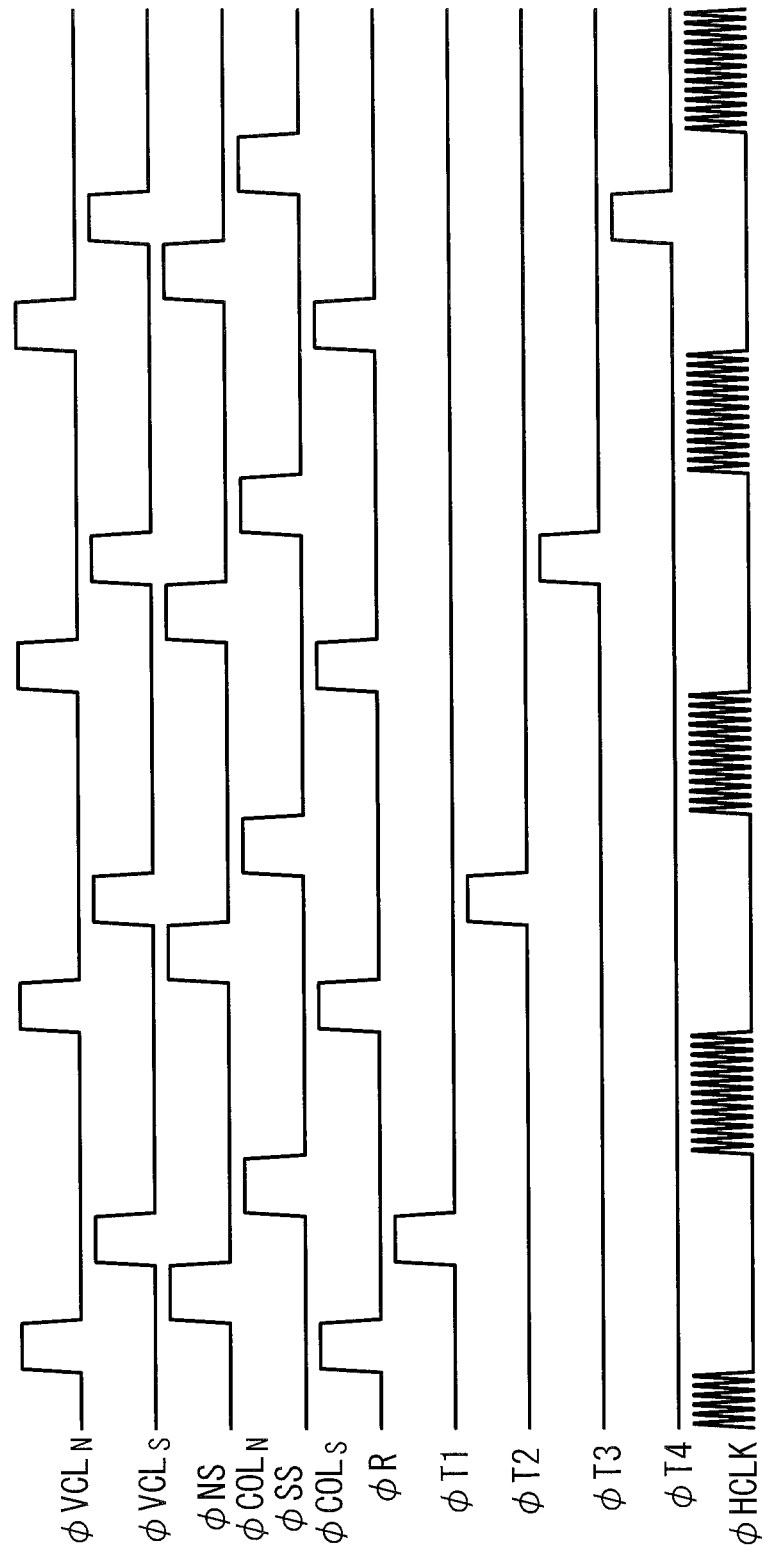
FIG. 6 is a timing chart showing an operation of the solid-state image pickup apparatus of FIG. 4.

An operation of the solid-state image pickup apparatus 30 according to the present embodiment configured as above will be described with reference to FIG. 6.

In the present embodiment, an operation of reading out the noise voltage and the signal-noise sum voltage from the four unit pixels 9 of each pixel group 31 is performed by repeating mainly three operations four times while switching among the unit pixels 9: an operation of outputting the noise voltage of one unit pixel 9 to one vertical signal line 6a and causing the noise voltage to be held in the parasitic capacitance of the vertical signal line 6a temporarily; an operation of outputting the signal-noise sum voltage to the other vertical signal line 6b and causing the signal-noise sum voltage to be held in the parasitic capacitance of the vertical signal line 6b temporarily; and an operation of reading out the noise voltage and the signal-noise sum voltage held in the pair of vertical signal lines 6a and 6b, respectively, to the pair of the horizontal signal lines 7a and 7b.

That is, in the present embodiment, the vertical shift register (pixel selection part) 3 outputs four transfer pulses φT1 to φT4 to the transfer transistors 12 of the four unit pixels 9. By the transfer pulses φT1 to φT4 being outputted from the vertical shift register 3 at different times, respectively, signal-noise sum voltages from the unit pixels 9 are outputted to the other vertical signal line 6b and held at different times, respectively.

Then, after the noise voltage held in one vertical signal line 6a and the signal-noise sum voltage from one unit pixel 9, which is held in the other vertical signal line 6b, are read out to the two horizontal signal lines 7a and 7b, for all the pixel groups 31 within a selected line, the same operation is repeated four times while the unit pixels 9 are switched. Thereby, signal voltages from all the unit pixels 9 can be obtained.

As described above, according to the solid-state image pickup apparatus 30 according to the present embodiment, since the FD 13, the amplifier transistor 14 and the two selection transistors 10a and 10b are shared, for every four unit pixels 9, there is an advantage that the number of elements other than the PD 11 in the pixel array 2 is reduced to realize downsizing or high resolution.

Furthermore, in the present embodiment, two unit pixels 9 adjoining in a line direction crossing the vertical signal lines 6a and 6b extending in one direction share these vertical signal lines 6a and 6b as the same pixel group 31. Therefore, in comparison with a conventional solid-state image pickup apparatus in which one vertical signal line is arranged for one column of unit pixels 9, there is an advantage that it is possible to output a signal with a high noise immunity without increasing the area of parts other than the unit pixels 9.

Figure 7:
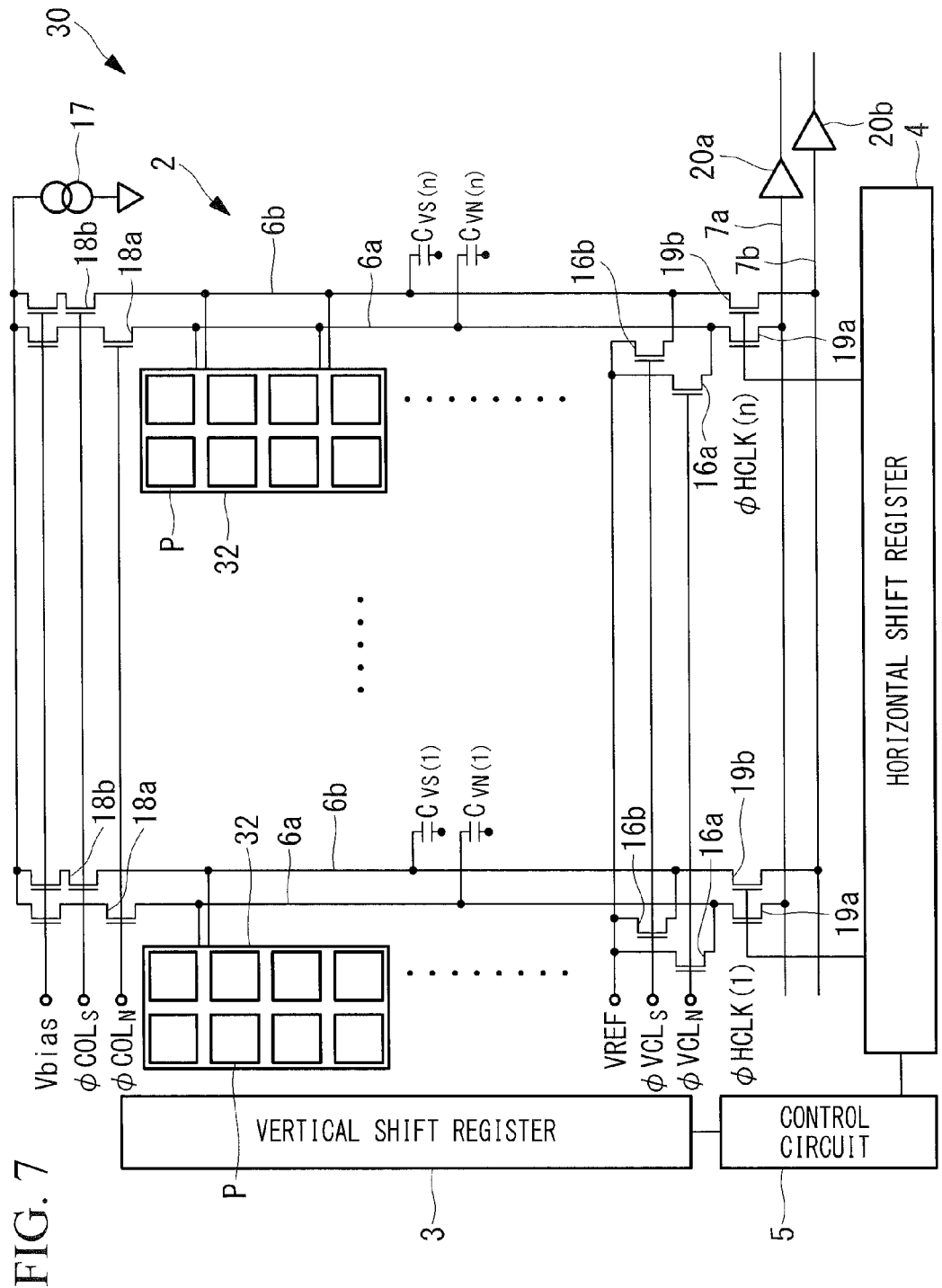
FIG. 7 is a circuit diagram showing a modification of the solid-state image pickup apparatus of FIG. 4.
Figure 8:
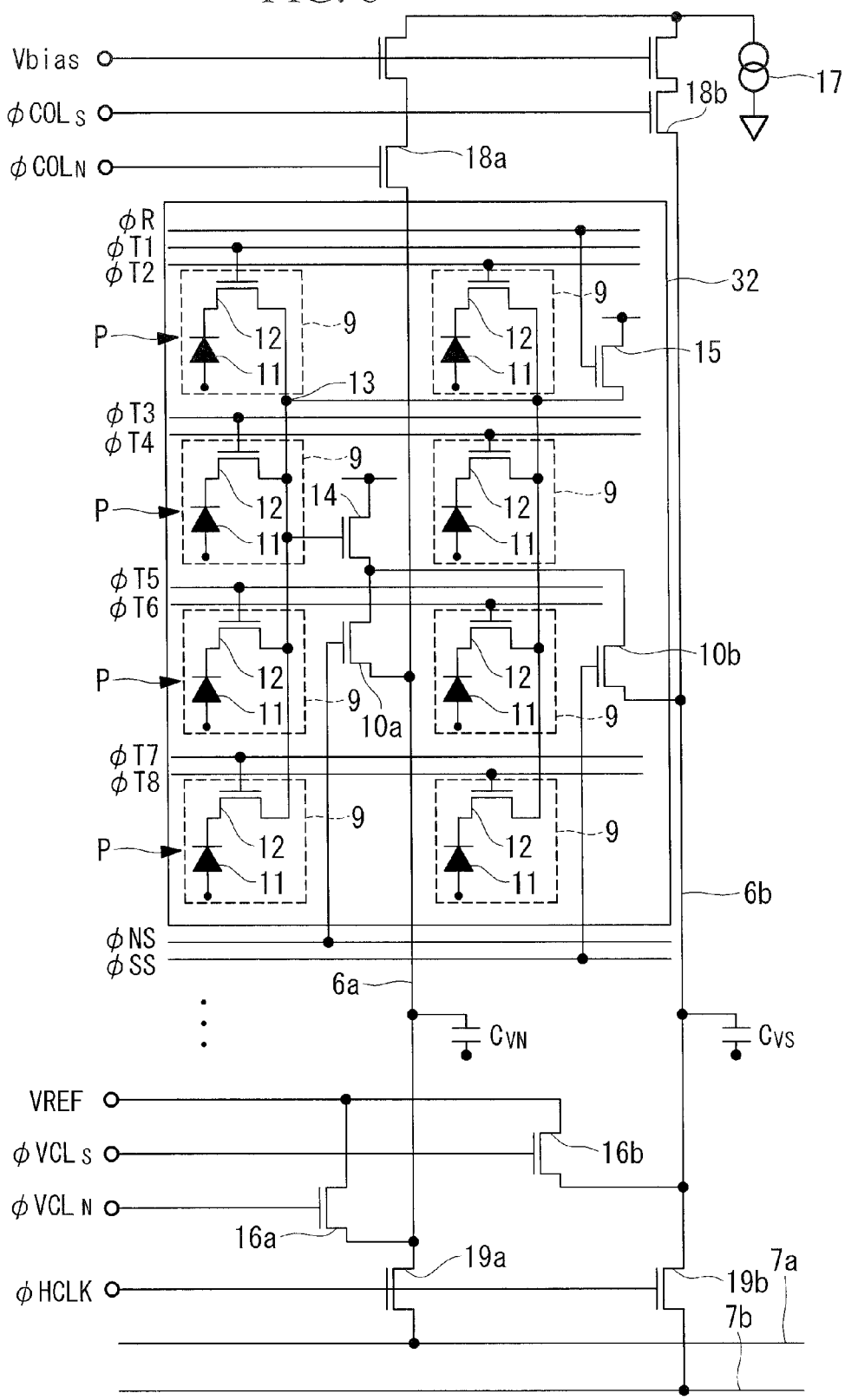
FIG. 8 is a circuit diagram showing a configuration of a column circuit including pixels which is provided for the solid-state image pickup apparatus of FIG. 7.
Figure 9:
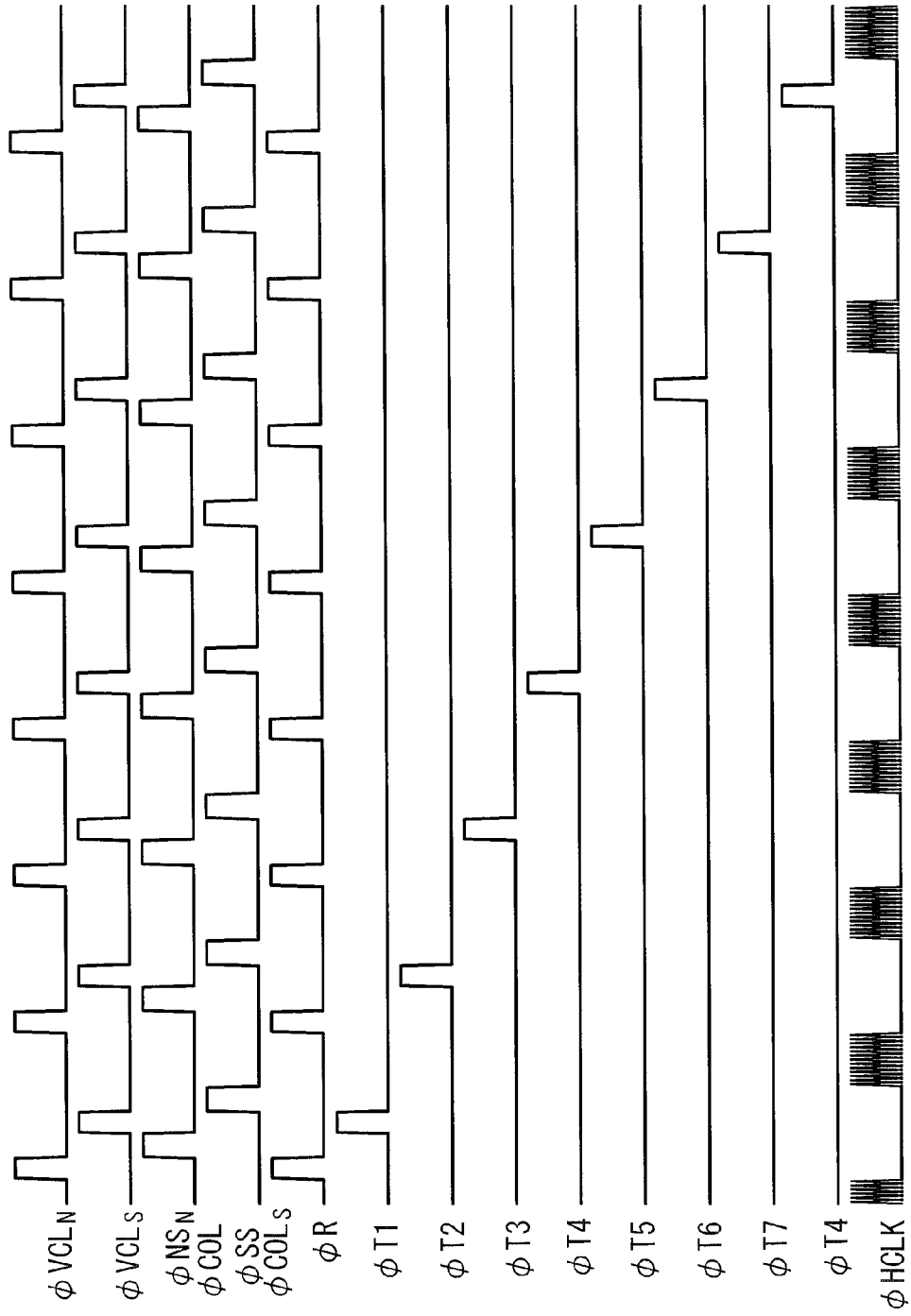
FIG. 9 is a timing chart showing an operation of the solid-state image pickup apparatus of FIG. 7.

In the present embodiment, description has been made, with the case where the pixel group 31 includes four unit pixels 9 as an example. However, this is not limiting. Any number of unit pixels 9 equal to or more than one may be included. For example, a pixel group 32 may include eight unit pixels 9 as shown in FIGS. 7 to 9.

In the present embodiment, description has been made, with a so-called constant-current load type readout method in which, at the time of reading out noise voltage and signal-noise sum voltage to a pair of vertical signal lines 6a and 6b, the readout is performed for a predetermined time while the vertical signal lines 6a and 6b are connected to the constant current source 17 to cause a constant current to flow, as an example. However, instead, a capacity load type readout method may be adopted in which readout is performed without connecting to the constant current source 17.

Figure 10:
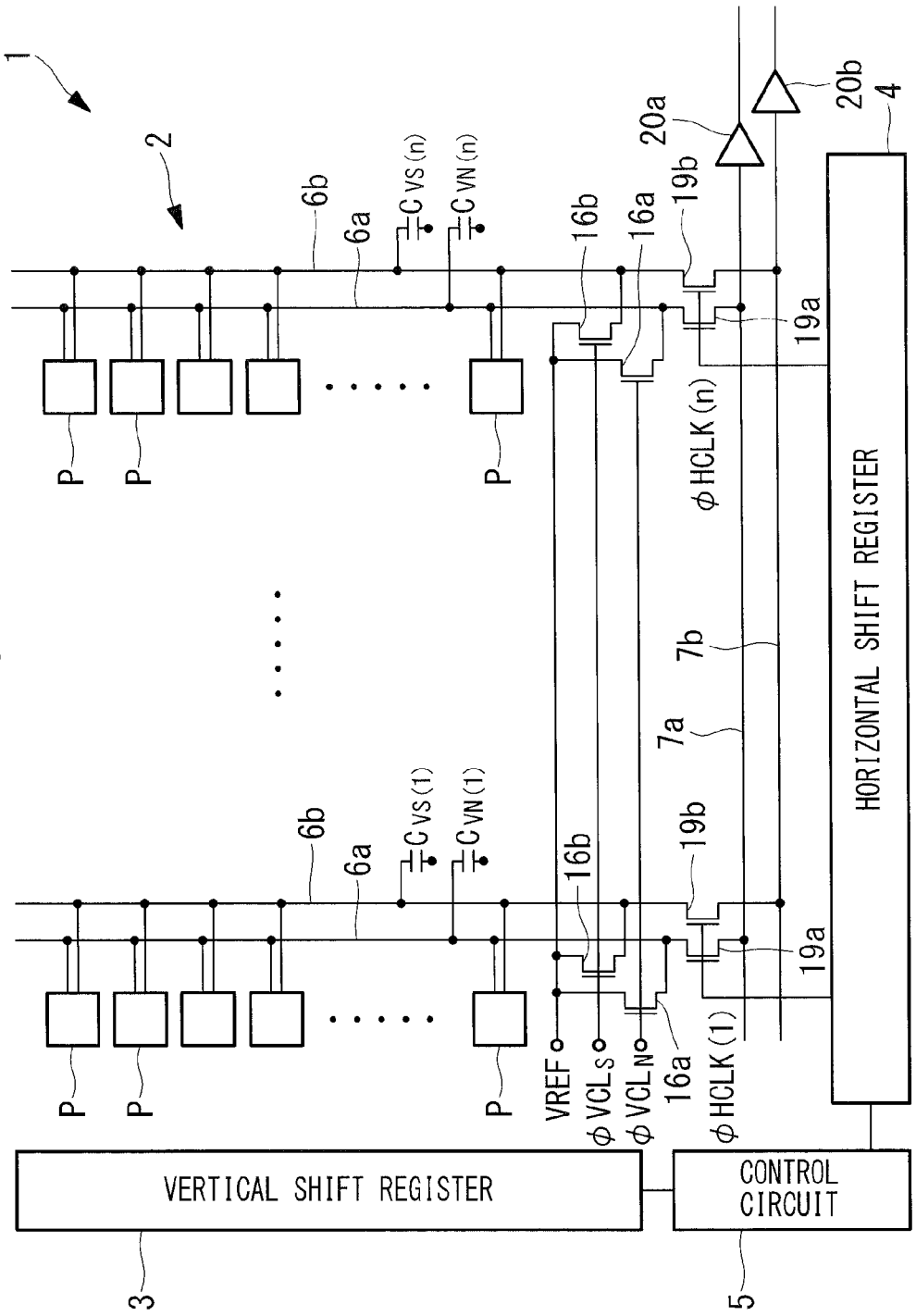
FIG. 10 is circuit diagram showing a configuration of a modification of the solid-state image pickup apparatus of FIG. 1, which is a capacity load type solid-state image pickup apparatus.
Figure 11:
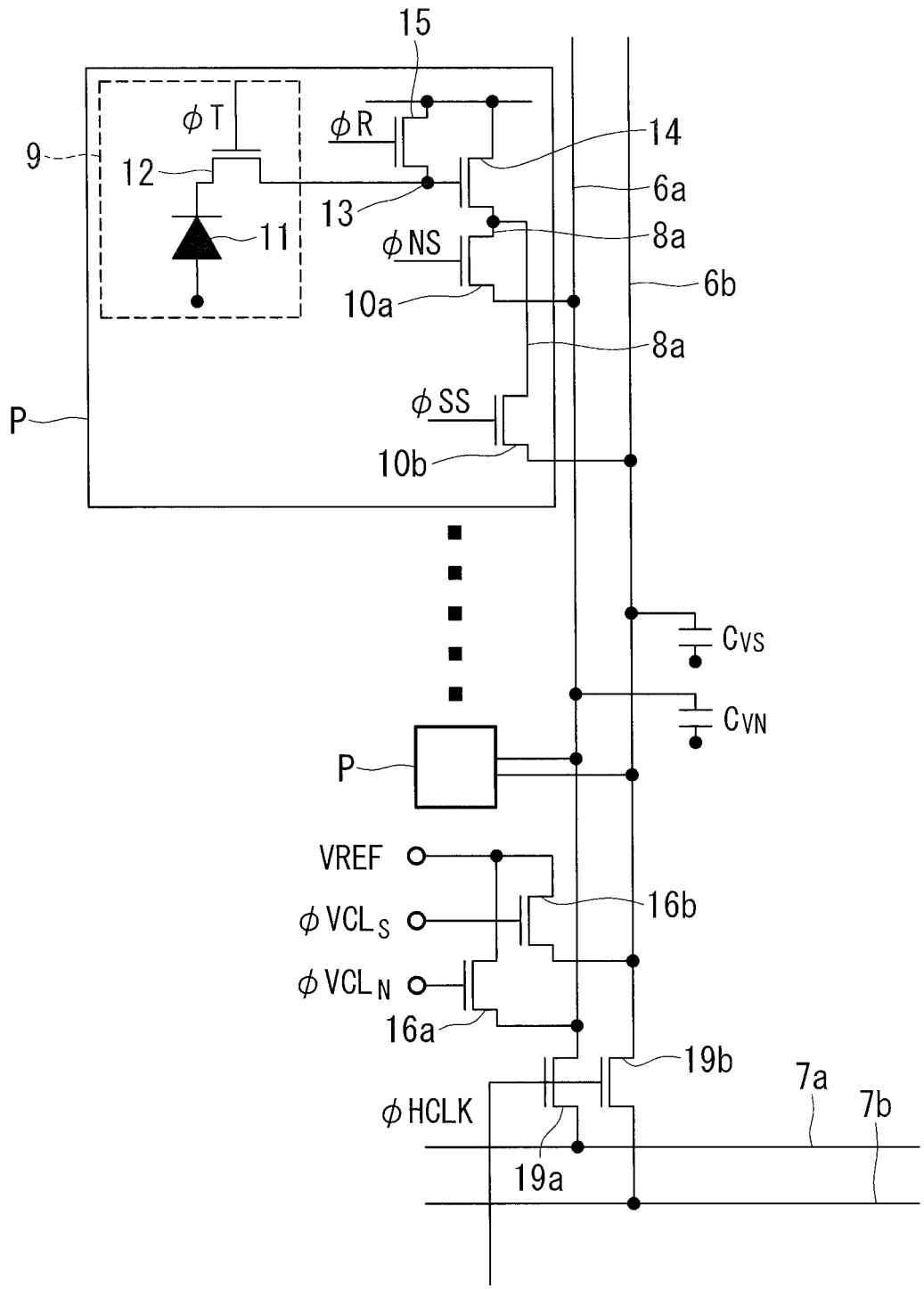
FIG. 11 is a circuit diagram showing a configuration of a column circuit including pixels which is provided for the solid-state image pickup apparatus of FIG. 10.
Figure 12:
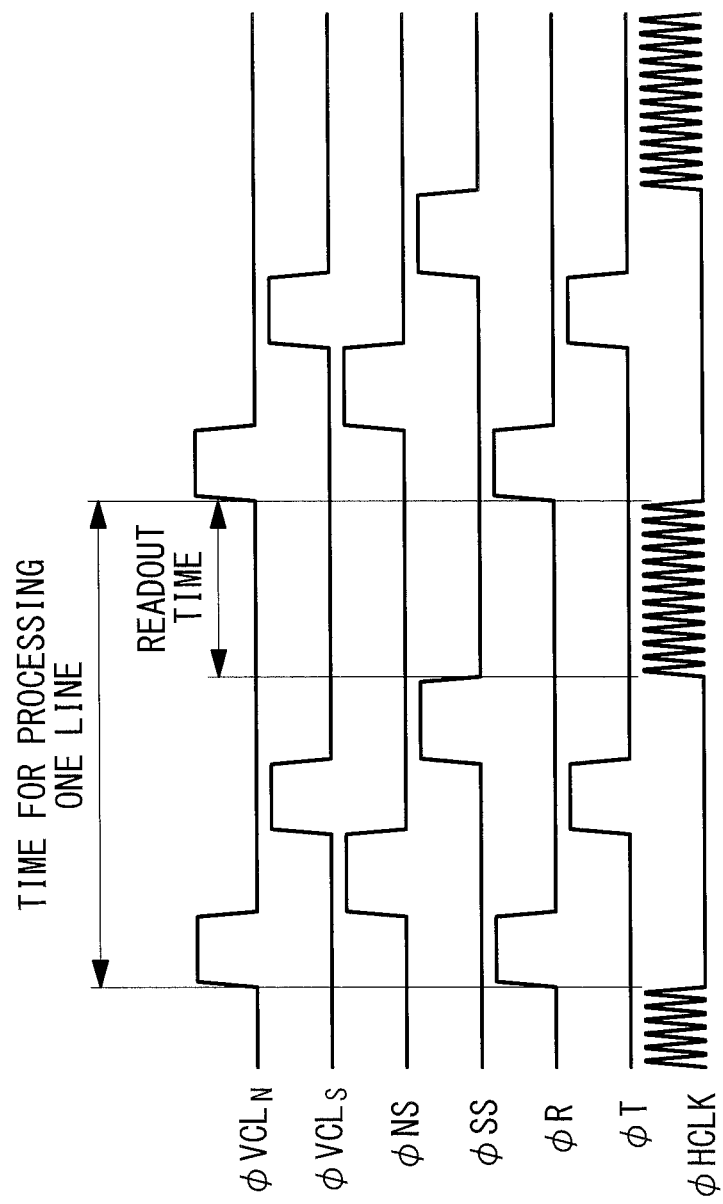
FIG. 12 is a timing chart showing an operation of the solid-state image pickup apparatus of FIG. 10.

A block diagram and a timing chart in the case of adopting the capacity load type readout method are shown in FIGS. 10 to 12, respectively. As for the case of the capacity load type also, the capacity load type can be applied to the image group 31 which includes a plurality of pixels P.

An advantageous effect similar to that of the constant-current load type can be obtained by this capacity load type also. Furthermore, since it is possible to do without the constant current source 17, the constant current source connection switches 18a and 18b and control signals therefor, there is an advantage that it is possible to more simply make a configuration and perform control.

In the case of the constant-current load type, the signal line reset transistors 16a and 16b which reset the vertical signal lines 6a and 6b to the reset voltage VREF may not be provided.

Though the case of application to the pixel array 2 in which pixels are arrayed in a matrix shape has been shown as an example in the present embodiment, application to a pixel array in which pixels are arrayed in a honeycomb shape is also possible.

Furthermore, though it is assumed that the charge conversion element 13 converts a charge to voltage and outputs the voltage in the present embodiment, what converts a charge to a current and outputs the current may be adopted instead.

In the present embodiment, the parasitic capacitances of the vertical signal lines 6a and 6b are used to cause noise voltage and signal-noise sum voltage to be held in the vertical signal lines 6a and 6b. Thereby, it is possible to realize downsizing of the solid-state image pickup apparatuses 1 and 30 without necessity of a special capacitive element.

However, the present invention is not limited thereto. A capacitive element (not shown) may be connected to each of the vertical signal lines 6a and 6b. Thereby, the advantageous effect can be also obtained that it is possible to output a signal with a high noise immunity even if pixel output fluctuates during a readout period, due to reduction in time difference between noise voltage and signal-noise sum voltage.

According to the above-described solid-state image pickup apparatus, when an incident light enters the optical-electrical conversion element in a unit pixel belonging to each pixel group, a signal charge occurs by optical-electrical conversion and is held in the optical-electrical conversion element. A noise signal which occurs by resetting the charge conversion element provided for the unit pixel is outputted to each first transfer line from the output terminal of each pixel group and is held in each first transfer line in the form of voltage with a magnitude corresponding to the noise signal by switching the first switch to an ON state.

When the first switch is switched to an OFF state to output the signal charge from the optical-electrical conversion element of the same unit pixel in this state, the signal charge is converted to a current or voltage by the charge conversion element. By switching the second switch to an ON state, a signal-noise sum signal is outputted from the output terminal of the pixel group to the second transfer line and is held in the second transfer line in the form of voltage with a magnitude corresponding to the signal-noise sum signal.

Then, by switching the third and fourth switches provided for the first and second transfer lines connected to the same pixel group to an ON state, the noise signal held in the first transfer line and the signal-noise sum signal held in the second transfer line can be outputted to the third and fourth transfer lines, respectively, at the same time. That is, by subtracting the noise signal from the signal-noise sum signal at a subsequent stage of the third and fourth transfer lines, a signal corresponding to the strength of the incident light can be acquired accurately.

In this case, since a noise signal and a signal-noise sum signal which are separately outputted from the unit pixel are held in the separate first and second transfer lines, it becomes possible to, immediately after outputting a noise signal from each unit pixel, output a signal-noise sum signal of the same unit pixel, and it is possible to remove noise accurately and construct an image constituted by signals with a high noise immunity even if pixel output fluctuates during a readout period.

The first and second transfer lines may extend linearly in a first direction with an interval in parallel, and each of the pixel groups may include two unit pixels arrayed adjoining each other in a direction crossing the first direction.

By doing so, the two unit pixels arrayed adjoining each other in the direction crossing the first and second transfer lines can share the first and second transfer lines as the same pixel group. As a result, in comparison with a conventional solid-state image pickup device in which one transfer line is arranged for one column of unit pixels, it is possible to provide a solid-state image pickup apparatus capable of outputting a signal with a high noise immunity without increasing the area of parts other than the unit pixels.

Furthermore, there may be provided a first reset part which resets the first transfer line to a first reset state and a second reset part which resets the second transfer line to a second reset state.

By doing so, the first transfer line can be set to a floating potential state by switching the first reset part to an OFF state after switching the first reset part to an ON state to reset the first transfer line to the first reset state. Furthermore, the second transfer line can be set to a floating potential state by switching the second reset part to an OFF state after switching the second reset part to an ON state to reset the second transfer line to the second reset state. Thereby, it is possible to read out a signal accurately even in a so-called capacity load type readout method in which a constant current is not supplied at the time of reading out a noise signal or a signal-noise sum signal to the first and second transfer lines.

Furthermore, it is also possible that the solid-state image pickup apparatus is provided with: a pixel selection part selecting the unit pixel to be caused to output a signal to the first transfer line or the second transfer line from the output terminal of the pixel group; and that the solid-state image pickup apparatus causes the first transfer lines to be in a floating potential state by, after causing the first reset part to be in an ON state to be in a first reset state, switching the first reset part to an OFF state; stores a noise signal outputted from the unit pixel selected by the pixel selection part into the first transfer line in the floating potential state by reading out the noise signal to the first transfer line for a predetermined time; causes the second transfer lines to be in a floating potential state by, after causing the second reset part to be in an ON state to be in a second reset state, switching the second reset part to an OFF state; stores a signal-noise sum signal outputted from the unit pixel selected by the pixel selection part into the second transfer line in the floating potential state by reading out the signal-noise sum signal to the second transfer line for a predetermined time; reads out the noise signal stored in the first transfer line to the third transfer line via the third switch; and reads out the signal-noise sum signal stored in the second transfer line to the fourth transfer line via the fourth switch.

By doing so, it is possible to read out a noise signal read out to the first transfer line accurately and a signal-noise sum signal read out to the second transfer line accurately, to the third or fourth transfer line, respectively, with a little time difference by a so-called capacity load type readout method, and it is possible to remove noise accurately and construct an image constituted by signals with a high noise immunity even if pixel output fluctuates during a readout period.

Furthermore, it is also possible that the solid-state image pickup apparatus is provided with: a pixel selection part selecting the unit pixel to be caused to output a signal to the first transfer line or the second transfer line from the output terminal of the pixel group; first constant current circuit elements turning on/off supply of a constant current to the first transfer lines; and second constant current circuit elements turning on/off supply of a constant current to the second transfer lines; and that the solid-state image pickup apparatus stores the noise signal outputted from the unit pixel selected by the pixel selection part into the first transfer line by, after reading out the noise signal to the first transfer line for a predetermined time, causing the first constant current circuit element to be in an OFF state while supplying a constant current to the first transfer line with the first constant current circuit element turned on; stores the signal-noise sum signal outputted from the unit pixel selected by the pixel selection part into the second transfer line by, after reading out the signal-noise sum signal to the second transfer line for a predetermined time, causing the second constant current circuit element to be in an OFF state while supplying a constant current to the second transfer line with the second constant current circuit element turned on; reads out the noise signal stored in the first transfer line to the third transfer line via the third switch; and reads out the signal-noise sum signal stored in the second transfer line to the fourth transfer line via the fourth switch.

By doing so, it is possible to read out a noise signal read out to the first transfer line accurately and a signal-noise sum signal read out to the second transfer line accurately, to the third or fourth transfer line, respectively, with a little time difference by a so-called constant-current load type readout method, and it is possible to remove noise accurately and construct an image constituted by signals with a high noise immunity even if pixel output fluctuates during a readout period.

REFERENCE SIGNS LIST

1, 30 solid-state image pickup apparatus
3 vertical shift register (pixel selection part)
6a vertical signal line (first transfer line)
6b vertical signal line (second transfer line)
7a horizontal signal line (third transfer line)
7b horizontal signal line (fourth transfer line)
8a, 8b output terminal
9 unit pixel
10a selection transistor (first switch)
10b selection transistor (second switch)
11 optical-electrical conversion element, PD
13 charge conversion element, FD
16a signal line reset transistor (first reset part)
16b signal line reset transistor (second reset part)
18a constant current source connection transistor (first constant current circuit element)
18b constant current source connection transistor (second constant current circuit element)
19a vertical signal line selection switch (third switch)
19b vertical signal line selection switch (fourth switch)
31, 32 pixel group

The invention claimed is:
1. A solid-state image pickup apparatus comprising:
a plurality of two-dimensionally arrayed unit pixels, each of the unit pixels including an optical-electrical conversion element performing optical-electrical conversion of an incident light;
a charge conversion element and two output terminals provided for each of a plurality of pixel groups, each pixel group including one or more of the unit pixels, the charge conversion element converting a signal charge optical-electrical converted by the optical-electrical conversion element of each of the unit pixels in the pixel group into a voltage or current, and the two output terminals being capable of outputting a noise signal that occurs at the time of resetting the charge conversion element and a signal-noise sum signal obtained by adding a signal that has occurred by optical-electrical conversion to the noise signal separately;

a plurality of first transfer lines to which ones of the output terminal pairs of a plurality of the pixel groups are connected in common, the plurality of first transfer lines being capable of holding voltages based on the noise signals outputted from the output terminals;

a plurality of second transfer lines to which the others of the output terminal pairs of the plurality of the pixel groups are connected in common, the plurality of second transfer lines being capable of holding voltages based on the signal-noise sum signals outputted from the output terminals;

first switches arranged between the ones of the output terminal pairs and the first transfer lines;

second switches arranged between the others of the output terminal pairs and the second transfer lines;

a third switch provided for each of the first transfer lines;

a fourth switch provided for each of the second transfer lines;

a third transfer line to which the plurality of first transfer lines are connected in parallel via the third switches, respectively; and a fourth transfer line to which the plurality of second transfer lines are connected in parallel via the fourth switches, respectively.

2. The solid-state image pickup apparatus according to claim 1, wherein
the first transfer lines and the second transfer lines extend linearly in a first direction at an interval in parallel; and
each of the pixel groups includes two unit pixels arrayed adjoining each other in a direction crossing the first direction.

3. The solid-state image pickup apparatus according to claim 1, comprising:
first reset parts resetting the first transfer lines to a first reset state; and
second reset parts resetting the second transfer lines to a second reset state.

4. The solid-state image pickup apparatus according to claim 3, comprising a pixel selection part selecting the unit pixel to be caused to output a signal to the first transfer line or the second transfer line from the output terminal of the pixel group; wherein
the solid-state image pickup apparatus causes the first transfer line to be in a floating potential state by, after causing the first reset part to be in an ON state to be in a first reset state, switching the first reset part to an OFF state;
stores a noise signal outputted from the unit pixel selected by the pixel selection part into the first transfer line in the floating potential state by reading out the noise signal to the first transfer line for a predetermined time;
causes the second transfer line to be in a floating potential state by, after causing the second reset part to be in an ON state to be in a second reset state, switching the second reset part to an OFF state;
stores a signal-noise sum signal outputted from the unit pixel selected by the pixel selection part into the second transfer line in the floating potential state by reading out the signal-noise sum signal to the second transfer line for a predetermined time;
reads out the noise signal stored in the first transfer line to the third transfer line via the third switch; and
reads out the signal-noise sum signal stored in the second transfer line to the fourth transfer line via the fourth switch.

5. The solid-state image pickup apparatus according to claim 1, comprising:
a pixel selection part selecting the unit pixel to be caused to output a signal to the first transfer line or the second transfer line from the output terminal of the pixel group;
first constant current circuit elements turning on/off supply of a constant current to the first transfer lines; and
second constant current circuit elements turning on/off supply of a constant current to the second transfer lines; wherein
the solid-state image pickup apparatus stores the noise signal outputted from the unit pixel selected by the pixel selection part into the first transfer line by, after reading out the noise signal to the first transfer line for a predetermined time, causing the first constant current circuit element to be in an OFF state while supplying a constant current to the first transfer line with the first constant current circuit element turned on;
stores the signal-noise sum signal outputted from the unit pixel selected by the pixel selection part into the second transfer line by, after reading out the signal-noise sum signal to the second transfer line for a predetermined time, causing the second constant current circuit element to be in an OFF state while supplying a constant current to the second transfer line with the second constant current circuit element turned on;
reads out the noise signal stored in the first transfer line to the third transfer line via the third switch; and
reads out the signal-noise sum signal stored in the second transfer line to the fourth transfer line via the fourth switch.

* * * * *

UNITED STATES PATENT AND TRADEMARK OFFICE
CERTIFICATE OF CORRECTION

PATENT NO. : 9,264,637 B2
APPLICATION NO. : 14/513365
DATED : February 16, 2016
INVENTOR(S) : Shigetoshi Sugawa et al.

Page 1 of 1

It is certified that error appears in the above-identified patent and that said Letters Patent is hereby corrected as shown below:

Title Page

It Should Read:

(71) Applicant: Tohoku University, Miyagi (JP);
OLYMPUS CORPORATION, Tokyo (JP)

Signed and Sealed this
Second Day of August, 2016

Michelle K. Lee
*Director of the United States Patent and Trademark Office*